United States Patent [19]
Griner

[11] Patent Number: 4,589,301
[45] Date of Patent: May 20, 1986

[54] LINEARLY INFINITELY VARIABLE MECHANISM

[75] Inventor: Glenn C. Griner, Ann Arbor, Mich.

[73] Assignee: Hoover Universal, Inc., Ann Arbor, Mich.

[21] Appl. No.: 488,963

[22] Filed: Apr. 27, 1983

[51] Int. Cl.⁴ .......................................... F16H 25/20
[52] U.S. Cl. .............................. 74/586; 74/424.8 R; 188/67; 188/196 D; 188/202
[58] Field of Search ................ 74/586, 424.8 R; 188/67, 71.1, 196 D, 202; 297/348, 355

[56] References Cited

U.S. PATENT DOCUMENTS

| | | | |
|---|---|---|---|
| 2,501,976 | 3/1950 | Vitek | 297/348 |
| 2,579,305 | 12/1951 | Cushman | 74/586 |
| 3,046,055 | 7/1962 | Martens | 188/196 D |
| 3,127,788 | 4/1964 | Martens | 74/586 |
| 3,249,183 | 5/1966 | Billeter | 188/196 D |
| 3,283,861 | 11/1966 | Mersereau | 188/196 D |
| 3,350,135 | 10/1967 | Martens | 297/355 |
| 3,356,411 | 12/1967 | Homier et al. | 297/355 |
| 3,398,986 | 8/1968 | Homier | 297/355 |
| 3,454,140 | 7/1969 | Billeter | 188/202 PL |
| 3,850,269 | 11/1974 | Beacon | 188/196 D |
| 4,022,304 | 5/1977 | Spalding | 188/196 D |

FOREIGN PATENT DOCUMENTS 140499  5/1953  Sweden ........................... 188/196 D Primary Examiner—Lawrence J. Staab
Attorney, Agent, or Firm—Stephenson and Boller

[57] ABSTRACT

A linearly infinitely variable mechanism comprises first and second portions which are relatively axially positionable to establish the effective length of the mechanism. A rotary element is axially captured on the second portion. The operative connection between the first portion and the second portion is via a threaded connection of the first portion with the rotary element. The axial capture of the rotary element comprises a twist lock which, when locked, forcefully abuts the ends of the rotary element to preclude its rotation and prevent a change in the effective length of the mechanism provided that the first and second portions are constrained against relative rotation. When unlocked, the rotary element can rotate within its axial capture so that axial forces applied to the mechanism are effective to change its length. Recesses are provided between the element and the twist lock and contain yieldably resiliently mounted bearings which promote free rotation of the element when unlocked but which retract into the recesses when locked.

18 Claims, 5 Drawing Figures

LINEARLY INFINITELY VARIABLE MECHANISM

BACKGROUND AND SUMMARY OF THE INVENTION

This invention relates to a linearly infinitely variable mechanism. More specifically, it relates to a mechanism of this type in which the mechanism is selectively operable to locked and unlocked conditions with adjustment of the effective length of the mechanism being permitted when it is in the unlocked condition but being prevented when it is in the locked condition.

The general subject matter of this invention is similar to that of the pending patent applications of James A. Bowman, Ser. No. 277,416, filing date June 25, 1981, and Ser. No. 455,452, filing date Jan. 4, 1983, commonly assigned.

Many types of apparatus require the relative positioning of component parts thereof. For example, in an automobile seat it is often desirable to provide for relative adjustment of the seat back on the seat cushion and to provide for relative adjustment of the seat on a seat track. It is probably fair to state that the majority of seat constructions which have embodied these adjustment capabilities in manually operable form comprise adjustment mechanisms in which adjustment is possible only to a limited number of preselected discrete positions. In order to promote a better adjustment capability which allows the user a greater precision in adjusting a seat, it is desirable to utilize infinitely adjustable mechanisms whereby an infinite range of adjustment positions are provided over a given adjustment range.

By way of illustration the two pending patent applications referred to above are illustrative of new linearly infinitely variable mechanisms.

Where such a mechanism is intended for mass production usage, such as in automotive applications, it is virtually essential to provide a mechanism which is highly effective yet not overly expensive, if it is to be acceptable to an automobile manufacturer. Moreover, it must be easy to operate if it is to be acceptable to the user.

The present invention is directed to a new and improved linearly infinitely variable mechanism which admirably meets these objectives. It possesses a number of important attributes including compactness, fabrication by conventional manufacturing techniques, ease of operation, virtually noiseless operation and very effective locking action.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
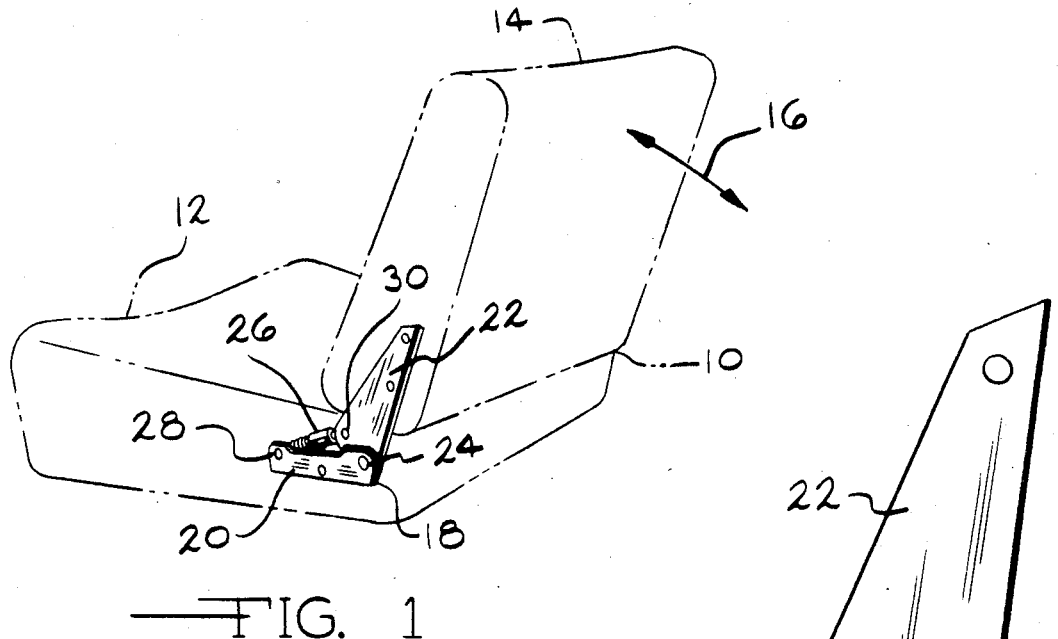
FIG. 1 is a perspective view partly in broken lines illustrating application of the linearly infinitely variable mechanism of the present invention as a seat back recliner.

FIG. 1 illustrates a seat 10 which is representative of typical automobile seats. It comprises a cushion 12 on which the occupant is seated and a back 14 against which the occupant leans. The cushion 12 comprises an underlying structure (not shown) via which it mounts on the floor of the vehicle. This additional structure will typically include a track for relative adjustment of the seat on the floor.

Back 14 and cushion 12 are coupled together to provide for relative angular positioning of the seat back on the cushion as indicated by arrow 16 in FIG. 1. Suitable hinge mechanism is employed to endow the seat with this capability and illustrative construction is shown generally at 18 in FIG. 1. The hinge mechanism comprises separate hinge members 20 and 22 respectively which are pivotally connected at 24 for relative pivotal displacement. Member 20 is affixed to suitable structure (not shown) of seat cushion 12 while member 22 is affixed to suitable structure (not shown) of seat back 14.

The linearly infinitely variable mechanism of the present invention is operatively connected with hinge members 20 and 22 and is itself identified by the general reference numeral 26. Briefly, mechanism 26 is attached to members 20 and 22 at attachment locations which are spaced radially of pivot 24. The attachment point of mechanism 26 to hinge member 20 is indicated at 28 while the point of attachment to hinge member 22 is indicated at 30.

Figure 2:
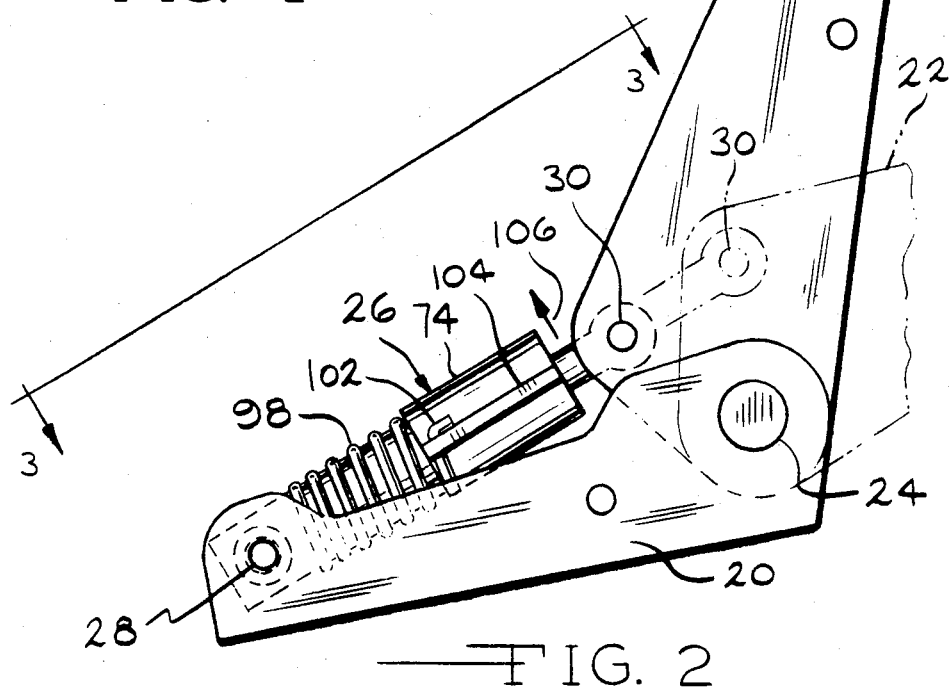
FIG. 2 is an enlarged side view of the solid line portion of FIG. 1, also illustrating a different operative position in broken lines.
Figure 3:
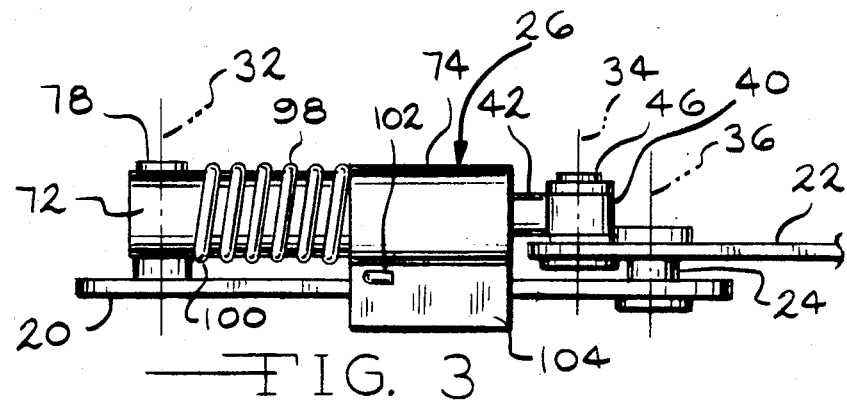
FIG. 3 is a view taken substantially in the direction of arrows 3—3 in FIG. 2.

Looking at the greater detail which can be seen in FIGS. 2 and 3 the points of attachment 28 and 30 comprise horizontal axes 32 and 34 respectively, parallel to the axis 36 of pivot 24. The respective attachments 28 and 30 are such that pivotal movement of the mechanism 26 about the respective axes 32 and 34 can take place as the two hinge members 20 and 22 are pivoted about pivot 24.

Figure 4:
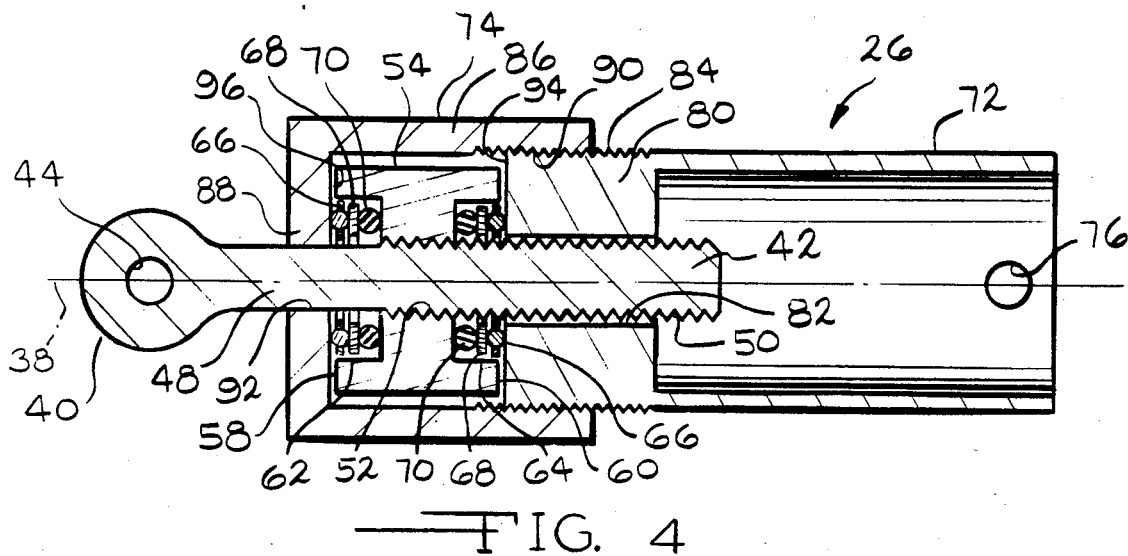
FIG. 4 is a longitudinal cross sectional view through the linearly infinitely variable mechanism of the preceding drawing figures and illustrates the mechanism in the unlocked condition.
Figure 5:
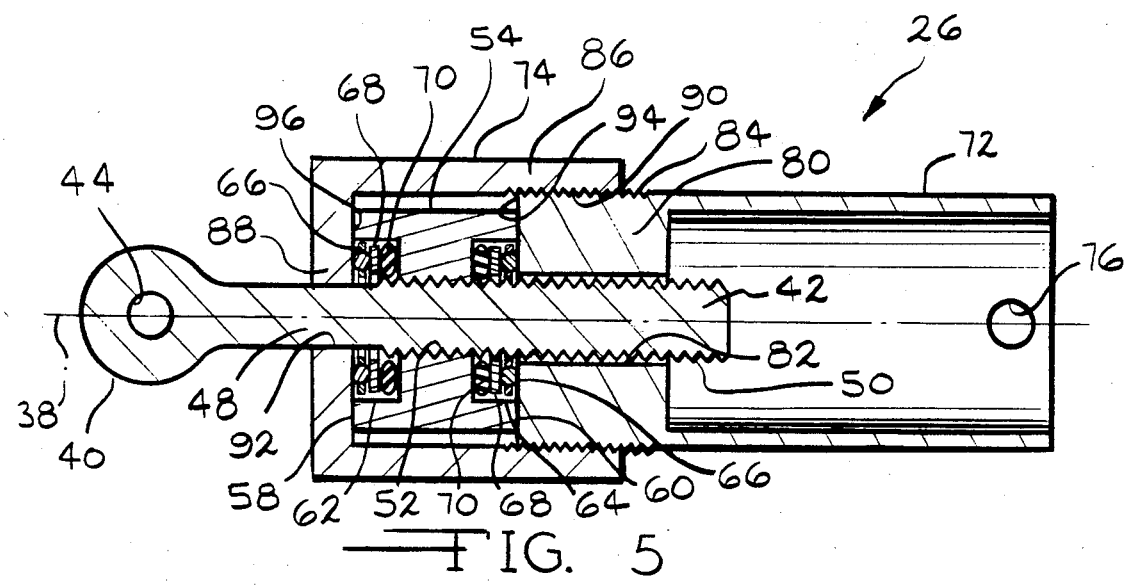
FIG. 5 is a longitudinal sectional view similar to FIG. 4 but illustrating the locked condition.

Looking also to FIGS. 4 and 5 it can be seen that the mechanism 26 comprises a central linear axis 38 which passes through the points of attachment of the mechanism to the hinge members 20 and 22. The illustrated construction of mechanism 26 and its attachment to the hinge members comprises an eyelet 40 at one end, this being the end which attaches to hinge member 22. The eyelet 40 is formed at one end of a shaft 42 which extends along axis 38. Eyelet 40 comprises a central circular aperture 44 and its attachment to hinge member 22 is made by a circular pivot pin 46 (FIG. 3) being passed through aperture 44 and a corresponding aperture in hinge member 22 with the member 46 being suitably secured to keep the two parts 42, 22 connected together.

Shaft 42 constitutes one portion of the mechanism and it comprises a main circular cylindrical body 48 extending from eyelet 40. The body of shaft 42 is provided with means on its exterior surface via which the shaft operatively couples with another portion of the mechanism. This means is referred to generally as a threaded portion and it comprises a plurality of threads which extend in helical fashion around the outside of body 48 from the distal end (right hand end of FIGS. 4 and 5) for more than half the length of the illustrated construction. This threaded portion is identified by the reference numeral 50, and the drawing figures illustrate the conventional drawing standard for a thread.

The operative coupling of threaded portion 50 is with a complementary threaded portion 52 of an annular element 54. The annular element 54 has its threaded portion 52 on its central bore which is concentric with axis 38. In its preferred form element 54 is of a circular outside diameter with axial end walls, or end face, 58 and 60 respectively which are disposed in planes at a right angle to axis 38.

A circular bore coaxial with axis 38 is provided centrally in each axial end of element 54. These bores form recesses identified by the reference numerals 62 and 64 respectively. Each is of circular cylindrical shape having a sidewall extending from the corresponding end face 58, 60 axially inwardly to terminate in an end wall which is parallel to the corresponding end face.

Disposed within each recess are means which assist in operatively relating element 54 with another portion of the mechanism. These means are a circular array of bearings 66, an annular bearing race 68, and a yieldable resilient annular element 70. The specific details of these components and their operative association with the mechanism will be subsequently explained.

Said another portion of the mechanism illustrated in the drawing figures comprises a tubular member 72 and a locking cap 74. Tubular member 72 extends longitudinally of the mechanism along axis 38 and the end of tubular member 72 opposite the end of shaft 42 (i.e. the right end as viewed in FIGS. 4 and 5) is provided with a pair of diametrically aligned holes 76 through its sidewall to provide for attachment to hinge member 20. As viewed in FIGS. 1, 2 and 3, attachment is made by means of a pin 78 passed through the holes 76 and an aligned hole in hinge member 20 with means being provided for keeping them connected.

Tubular member 72 is also provided with a transverse end wall 80 at the end thereof which is toward shaft 42 (i.e. left end as viewed in FIGS. 4 and 5). This end wall 80 is provided with a central circular hole 82 concentric with axis 38 and through which the distal right hand end of shaft 42 passes. Hole 82 provides clearance for the distal end of the shaft.

The outside diameter of tubular member 72 is of circular shape and is provided with a screw thread 84 which is generally axially co-extensive with the region of end wall 80.

Locking cap 74 comprises an axially extending sidewall 86 and a transverse end wall 88. The end of cap 74 which is toward tubular member 72 is open and is provided with an internal screw thread 90 via which the locking cap threads onto thread 84 of tubular member 72. The transverse end wall 88 of cap 74 comprises a circular hole 92 through which shaft 42 passes.

The face 94 of end wall 80 and the face 96 of end wall 88 are in confronting juxtaposition to the end walls 60 and 58 respectively of element 54. As such, the end walls of member 72 and the cap 74 serve to axially capture element 54 between their faces 94 and 96.

FIG. 4 illustrates the unlocked condition of the mechanism where it can be seen that the faces 96 and 94 are spaced apart so that an axial clearance is provided for element 54 between faces 94 and 96. In this condition it is possible for element 54 to be rotated within its axial capture by said another portion of the mechanism without interference from the confronting faces 94 and 96.

FIG. 5 illustrates the locked condition in which locking cap 74 is more fully threaded on tubular member 72 so that the faces 94 and 96 forcefully engage the end faces 60, 58 of element 54. In the locked condition the forceful engagement of the end faces 94, 96 with the end faces of element 54 constrain element 54 such that it cannot rotate within its axial confinement relative to tubular member 72 and cap 74. The invention thus comprises as one of its aspects a "twist lock" feature.

The arrays of bearings 66, races 68, and yieldable resilient elements 70 have a cooperative association with the mechanism in the following manner. In the unlocked condition of FIG. 4 each of the yieldable resilient elements 70 serves to urge the corresponding race 68 and circular array of bearings 66 axially outwardly of the corresponding recess 62, 64. Hence for the left hand recess 62 in FIG. 4 the array of bearings 66 is urged to the left against the face 96 of end wall 88 while for the right hand recess 64 the array of bearings 66 is urged to the right against the face 94 of end wall 80. Each array of bearings comprises a retainer which serves to retain individual bearing balls and it is these bearing balls which provide rolling contact with the corresponding race 68 and the corresponding face 94, 96. In this way the bearing balls serve to facilitate free rotation of element 54 between the walls which axially capture it when the mechanism is in the unlocked condition. The elements 70 in a preferred form are resilient elastomeric elements and generally will have a frictional engagement between element 54 and the races 68 such that the races 68 will rotate with element 54.

The relative dimensions of the mechanism's components are such that in the unlocked condition the annular elements 70 are effective to urge and maintain the races and bearing arrays with each set of bearing balls in rolling contact with the corresponding axially confining face 94, 96 so that they do not contact each other as the element rotates within its axial capture.

Cap 74 is operated to the locking condition by rotating it on member 72 to more fully thread onto member 72. This moves the axial confining wall faces 94, 96 closer together. As the axially confining wall faces 94, 96 move closer together, they urge the bearings and races more fully into the recesses, increasingly compressing the resilient elements 70 within the recesses. By making each element 70 of a circular annular shape having a circular cross section (i.e. in the form of an O-ring), they may be collapsed to a condition such as illustrated in FIG. 5 when the mechanism is locked; yet they will be effective when the cap is unlocked to return to the condition of FIG. 4. In the FIG. 4 condition the elements 70 may remain somewhat compressed so that they continue to urge the races and bearing arrays outwardly of the recesses. While this particular form for element 70 has advantages, it will be appreciated that other forms of yieldable resilient means may be used.

FIGS. 1, 2 and 3 illustrate a particularly convenient additional component which may be used in conjunction with the locking mechanism. This takes the form of a helical coiled spring 98 wrapped around the outside of the mechanism, having one end 100 engaged with tubular member 72 and the other end 102 engaged with cap 74. As can be seen in these drawing figures, cap 74 is provided with a radial flange 104 extending axially along one side and into which the end 102 of spring 98 hooks for its connection to the cap.

Spring 98 is effective to exert a torque on cap 74 urging it to the locked condition. When flange 104 is operated in the direction indicated by arrow 106 in FIG. 2, the cap is rotated against the spring resistance to unlock element 54. This permits the effective length of mechanism 26 to be changed. Once, the length change has been made, flange 104 is released and spring 98 is effective to return the cap to the locked condition. While the illustrated spring has certain advantages, other forms of biasing means may be employed if desired. Alternatively no biasing means need be employed at all if deemed preferable. Moreover, although manual adjustment is used to operate the twist lock mechanism embodied by cap 74, it will be possible to employ a remote control or a power device for operating the cap between locked and unlocked conditions.

With cap 74 having been operated to the unlocked condition, the effective length of mechanism 26 (i.e. the axial distance between hole 44 and holes 76) can be adjusted. Adjustment is made by applying axially directed forces to the mechanism.

In the seat back adjuster example illustrated in FIGS. 1, 2 and 3, the application of a force to the seat back tending to rotate it about the seat cushion creates a torque which is effective to pivot the two hinge members 20 and 22 about pivot 24. The torque is also reflected in the application of axial forces to infinitely variable mechanism 26. By virtue of their attachment to hinge 18, shaft 42 and tubular member 72 cannot rotate. The construction and arrangement of the threaded portions 50 and 52 is such that, with element 54 free to rotate, the threaded portion 50 of shaft 48 interacts with the threaded portion 52 of element 54 to initiate rotation of element 54 within its axial capture. The axial capture and the rotation of element 54 in turn allow translation of the shaft 42 through the bore of element 54. Hence, there is a correlation between the amount of rotation of element 54 and the amount of translation of shaft 42.

The construction is such that the operation is of bi-directional character. In other words, if the forces applied to mechanism 26 are such as to decrease its effective length, element 54 rotates in one direction, and shaft 42 is more fully displaced inwardly of member 72. If the forces acting on the mechanism are such as to increase its effective length, element 54 rotates in the opposite direction and shaft 42 is displaced outwardly of member 72.

With the mechanism locked so that element 54 cannot rotate, the application of axial forces urging a change in the effective length of the mechanism will not cause any such change. This is because the axial locking forces applied to the ends of element 54 by walls 80 and 88 impose a rotational resistance on element 54 greater than any torque which is imparted to the element via the interaction of threaded portions 50 and 52 in response to axial forces applied to the mechanism at its points of attachment to the hinge members 20, 22.

While the illustrated usage of mechanism 26 is in a seat back adjuster, it will be appreciated that the mechanism may be used in other applications.

The invention also can embody an inertial locking feature by virtue of the construction which has already been described. This would be particularly useful in the seat back adjuster application in the event that inertial loads are encountered when the cap is in other than a fully locked condition. For example, if the mechanism is not fully locked and the vehicle is involved in a sudden deceleration, such as panic braking or collision, the application of inertial forces arising out of the deceleration can be effective to cause element 54 to be urged axially within its axial capture so that one of its end faces forcefully abuts the corresponding axial confining face 94 or 96, depending on the direction of the inertial forces. Hence, such inertial forces can be effective to lock element 54 against rotation and thereby resist collapse or extension of the mechanism which might otherwise occur. Such inertial locking capability is created by a suitable selection of the yieldability of the annular elements 70 since they must yield to permit the inertial locking action to take place.

With mechanism 26 unattached to relatively positionable members such as the hinge members 20 and 22 of the example, there is no constraint against relative rotation of tube 72 and shaft 42 even though the mechanism itself be in the locked condition. In other words with mechanism 26 unattached and in the locked condition which prevents rotation of element 54 within its axial capture on the second portion of the mechanism constituted by tubular member 72 and cap 74, it is possible to rotate shaft 42 and to change the effective length of the mechanism. Thus in the disclosed preferred embodiment the constraints against relative rotation between the first and second portions of the mechanism are created by virtue of the mounting attachment of the mechanism itself to the relatively positionable members. In accordance with principles of the invention it is possible to provide other forms of attachment and other means for imposing rotational constraints relative to the first and second portions other than by virtue of the attachment of said first and second portions to the relatively positionable members such as the hinge members of the example.

Alternate embodiments are contemplated for the invention and as an example, the annular resilient elements 70 could be in the form of coil springs, conical washers, wave washers, etc. Another alternative construction would replace the helical spring 98 by a spring having one end connected to the flange and the opposite end connected to another point on the adjacent structure. This type of spring would be a linear spring as opposed to the torsional spring 98 which has been illustrated.

Thus, it can be seen that a new and unique linearly infinitely variable mechanism has been provided. While a preferred embodiment of the invention has been disclosed, it will be appreciated that principles of the invention are applicable to other embodiments.

What is claimed is:

1. In apparatus having relatively positionable member, a linearly infinitely variable mechanism for positioning said relatively positionable members, said linearly infinitely variable mechanism having an effective length along a linear axis thereof which is infinitely variable over a given linear range, said linear infinitely variable mechanism comprising first and second portions which are relatively positionable along said axis to cooperatively establish the effective length of said linearly infinitely variable mechanism, means mounting said first and second portions of said linearly infinitely variable mechanism on said apparatus to preclude their rotation relative to each other about said linear axis, and means operatively coupling said first and second portions of said linearly infinitely variable mechanism comprising an annular element concentric with said axis and means axially capturing said element on said second portion of said linearly infinitely variable mechanism, said means axially capturing said element comprising capturing portions which are relatively adjustable to one condition permitting said element to rotate about said axis relative to said first and second portions of said linearly infinitely variable mechanism and to another condition preventing such rotation, said element and said first portion of said linearly infinitely variable mechanism comprising an operative connection between then which is effective, when said capturing portions are in said one condition and axial forces are concurrently applied to said linearly infinitely variable mechanism to urge a change in the length thereof, to initiate rotation of said element about said axis relative to said first and second portions of said linearly infinitely variable mechanism, and said rotation of said element is in turn effective to permit translation of said first portion relative to both said element and said second portion thereby to change effective length of said mechanism, said element having transverse and faces at opposite axial ends thereof, and said capturing portions being disposed in confronting juxtaposition to said end faces and operable in said another condition to apply axial capturing frictional forces against both said end faces great enough to prevent said element from rotating with respect to said first and second portions of said linearly infinitely variable mechanism in response to axially applied forces tending to change the effective length thereof, said linearly infinitely variable mechanism comprising means defining a recess between one of said transverse end faces of said element and a corresponding juxtaposed confronting capturing portion of said axially capturing means and means disposed within said recess including bearing means and yieldable resilient means, said bearing means being urged by said yieldable resilient means to provide bearing support to promote free rotation of said element with respect to said second portion of said linearly infinitely variable mechanism when said capturing portions are in said one condition, said yieldable resilient means yielding when said capturing portions are in said another condition so as to allow said bearing means to be disposed more fully into said recess.

2. In apparatus as set forth in claim 1, said linearly infinitely variable mechanism comprising said recess being disposed in said one transverse end face of said element.

3. In apparatus as set forth in claim 2, said linearly infinitely variable mechanism comprising said recess being circular and concentric with said axis, said one transverse end face being disposed in a plane perpendicular to said axis and being circular.

4. In apparatus as set forth in claim 3, said linearly infinitely variable mechanism comprising said element having a circular sidewall extending parallel with said axis and being of the same diameter as said one transverse end face, said other transverse end face being disposed in a plane perpendicular to said axis and being circular and of the same diameter as said one transverse end face and said sidewall.

5. In apparatus as set forth in claim 1, said linearly infinitely variable mechanism comprising a central recess in each of said transverse end faces and means within each said recess including bearing means and yieldable resilient means, said means within each said recess being operable when said capturing portions are in said one condition to promote free rotation of said element with respect to said second portion of said mechanism and to lodge more fully into the corresponding recess when said capturing portions are in said another condition.

6. In apparatus as set forth in claim 5, said linearly infinitely variable mechanism comprising each said bearing means being a circular array of bearings concentric with said axis, an annular bearing race between said array of bearings and the corresponding yieldable resilient means, each said yieldable resilient means being disposed between the corresponding annular bearing race and a wall of the corresponding recess.

7. In apparatus as set forth in claim 6, said linearly infinitely variable mechanism comprising each said yieldable means comprising a compressible, resilient annular element concentric with the corresponding circular bearing array and annular bearing race.

8. In apparatus as set forth in claim 7, said linearly infinitely variable mechanism comprising said capturing portions being adjustable via a screw thread connection which is concentric with said axis.

9. Apparatus as set forth in claim 8, said linearly infinitely variable mechanism comprising said element comprising said transverse end walls thereof being disposed in planes perpendicular to said axis, said capturing portions comprising walls perpendicular to said axes which are relatively axially positionable to forcefully abut said transverse end walls of said element when said capturing portions are in said another condition, and said recesses comprising central circular bores in said transverse end walls of said element.

10. In apparatus as set forth in claim 9, said linearly infinitely variable mechanism comprising said second portion thereof comprising a main body and said axially capturing means including as one of said capturing portions a transverse wall disposed in fixed relation on said main body, said capturing means also including a separate element connected with said main body by said screw thread connection and having a transverse wall as another of said capturing portions so that threading of said separate element with respect to said main body is effective to axially move said transverse walls of said main body and said separate element toward and away from each other to adjust said axially capturing means to said conditions.

11. In apparatus as set forth in claim 10, said linearly infinitely variable mechanism coaprising apertures in both said transverse walls of said axially capturing means in alignment with said axis, said first portion of said linearly infinitely variable mechanism including a shaft extending axially through both said apertures.

12. In apparatus as set forth in claim 11, said first-mentioned element comprising a central aperture which is in alignment with the apertures of said transverse walls of said axially capturing means, said shaft also extending axially through said aperture of said first mentioned element, said operative coupling between said first portion of said linearly infinitely variable mechanism and said first-mentioned element being provided between said first-mentioned element and said shaft where the latter passes through the aperture of the former.

13. A linearly infinitely variable mechanism comprising first and second portions which are relatively positionable along a linear axis to establish an effective length which is infinitely variable over a given range along said axis, and means operatively coupling said first and second portions and selectively operable to plural conditions, one condition permitting relative axial positioning of said first and second portions to establish a desired effective length and another condition preventing relative axial positioning of said first and second portions, said means operatively coupling said first and second portions comprising an annular element concentric with said axis and means axially capturing said element on said second portion, said means axially capturing said element on said second portion comprising relatively axially positionable transverse walls having faces axially confronting said element, said element having transverse end faces at opposite axial ends thereof confronting said faces of said relatively positionable transverse walls, said axially capturing means and said element being constructed and arranged such that in said one condition said faces of said relatively positionable transverse walls are axially spaced apart to permit relative rotation about said axis between said element and said second portion and in said another condition said faces of said relatively positionable transverse walls forcefully axially abut and frictionally engage said end faces of said element to prevent relative rotation about said axis between said element said said second portion, means operatively coupling said first portion and said element such that in said another condition axial forces applied to said mechanism urging a change in its effective length are ineffective to change the effective length unless accompanied by a correlative rotational component of motion between said element and said first portion and in said one condition axial forces applied to said mechanism urging a change in its effective length are effective to change the effective length only if there is no said correlative rotational component of motion between said element and said first portion, means defining a recess between at least one of said faces of said relatively positionable transverse walls and the correpsonding end face of said element abutted thereby in said another condition, and means disposed within said recess including bearing means and yieldable resilient means, said bearing means being urged by said yieldable resilient means to provide bearing support to promote free rotation of said element with respect to said second portion in said one condition, said yieldable resilient means yielding in said another condition so as to allow said bearing means to be disposed more fully in said recess when said faces of said relatively positionable transverse walls are in abutment with said transverse end faces of said element.

14. A linearly infinitely variable mechanism as set forth in claim 13 wherein said recess in disposed in said element as a bore concentric with said axis.

15. A linearly infinitely variable mechanism as set forth in claim 14 wherein said yieldable resilient means comprises an annular member within said bore and said bearing means comprises an annular race member disposed against said annular member and a circular array of bearing balls disposed between said race member and the corresponding face of said relatively positionable transverse walls.

16. A linearly infinitely variable mechanism as set forth in claim 13 in which said second portion comprises a main body having a fixed transverse wall constituting one of said relatively positionable transverse walls and another of said relatively positionable transverse walls is constituted by an axial wall of a separate cap element, said separate cap element and said main body having a screw thread connection such that the two are relatively rotatable about said axis to relatively position said relatively positionable transverse walls and hence selectively operate said mechanism to said one and said another conditions.

17. A linearly infinitely variable mechanism as set forth in claim 16 including a helical coiled spring disposed concentrically around said mechanism and operatively coupled between said main body and said cap to urge said cap toward said another condition.

18. A linearly infinitely variable mechanism comprising first and second portions which are relatively positionable along a linear axis to establish an effective length which is infinitely variable over a given range along said axis, and means operatively coupling said first and second portions and selectively operable to plural conditions, one condition permitting relative axial positioning of said first and second portions to establish a desired effective length and another condition preventing relative axial positioning of said first and second portions, said means operatively coupling said first and second portions comprising an annular element concentric with said axis and means axially capturing said element on said second portion, said means axially capturing said element on said second portion comprising relatively axially positionable surfaces, said axially capturing means and said element being constructed and arranged such that in said one condition said relatively axially positionable surfaces are axially spaced apart to permit relative rotation about said axis between said element and said second portion and in said another condition said relatively axially positionable surfaces forcefully axially abut and frictionally engage said element to prevent relative rotation about said axis between said element and said second portion, means operatively coupling said first portion and said element such that in said another condition axial forces applied to said mechanism urging a change in its effective length are ineffective to change the effective length unless accompanied by a correlative rotational component of motion between said element and said first portion and in said one condition axial forces applied to said mechanism urging a change in its effective length are effective to change the effective length only if there is no said correlative rotational component of motion between said element and said first portion, said element having transverse end faces at axial ends thereof and said means axially capturing said element on said second portion comprises said axially positionable surfaces being disposed coaxial with said element and confronting said transverse end faces for selective coaction therewith to prevent and permit relative rotation about said axis between said element and said second portion, and further including means defining a recess between at least one of said relatively axially positionable surfaces and the corresponding end face of said element confronted thereby, and means disposed within said recess including bearing means and yieldable resilient means, said bearing means being urged by said yieldable resilient means to provide bearing support to promote free rotation of said element with respect to said second portion in said one condition, said yieldable resilient means yielding in said another condition so as to allow said bearing means to be disposed more fully in said recess when said relatively axially positionable surfaces coact with said element to prevent rotation thereof relative to said second portion.

* * * * *